United States Patent [19]
Long et al.

[11] 3,844,805
[45] Oct. 29, 1974

[54] DRY CUTTING COMPOUND FOR PROTEIN GLUES AND METHOD OF USE

[75] Inventors: Ronald W. Long, Florissant; Robert P. Starr, Spanish Lake, both of Mo.; James C. Hubert, Belleville, Ill.

[73] Assignee: Ralston Purina Company, St. Louis, Mo.

[22] Filed: July 14, 1972

[21] Appl. No.: 271,980

[52] U.S. Cl............ 106/79, 106/84, 106/135, 106/136, 106/154 R, 106/316
[51] Int. Cl...... C09d 1/04, C09h 5/00, C09h 11/00
[58] Field of Search............ 106/79, 84, 316, 154 R, 106/135, 136

[56] References Cited
UNITED STATES PATENTS

| | | | |
|---|---|---|---|
| 2,894,847 | 7/1959 | Wright | 106/79 |
| 3,392,038 | 7/1968 | Teyral | 106/79 |
| 3,436,300 | 4/1969 | Bryner | 106/79 |
| 3,704,148 | 11/1972 | Wright et al. | 106/79 |

FOREIGN PATENTS OR APPLICATIONS

| | | | |
|---|---|---|---|
| 82 | 1/1883 | Great Britain | 106/79 |
| 665,333 | 4/1935 | Germany | 106/79 |

OTHER PUBLICATIONS

Skeist, "Handbook of Adhesives," Van Nostrand, Reinhold Company, pages 131, 133, 134 and 151, 1962.

*Primary Examiner*—Allan Lieberman
*Attorney, Agent, or Firm*—Veo Peoples, Jr.; Virgil B. Hill

[57] ABSTRACT

This invention is directed to a new compound for preparing "cold cutting" or uncooked protein glues and to the method of using the compound to prepare glues. The compound contains a new preservative system of barium metaborate, and a silicate alkalizing agent to provide the pH necessary to produce a "cold cutting" adhesive. A buffering system is used after dispersing the protein to prevent damage to the protein and consequent degradation of adhesive properties.

5 Claims, No Drawings

DRY CUTTING COMPOUND FOR PROTEIN GLUES AND METHOD OF USE

BACKGROUND OF THE INVENTION

"Cold cutting" or uncooked protein glues have been used as industrial adhesives for some time. "Cold cutting" adhesives offer many advantages over cooked glues; they don't require the investment in heating equipment that cooked glues require and are more convenient to prepare. Typical "cold cutting" adhesives are the carbon disulfide adhesives disclosed in U.S. Pat. Nos. 3,206,320 and 3,206,321 and the soy protein adhesives disclosed in U.S. Pat. Nos. 2,810,657 and 2,894,847. "Cold cutting" protein adhesives of the type disclosed in the above patents require a high pH treatment to develop satisfactory bonding properties in the glue. The pH treatment, though necessary, presents a number of problems and characteristics which must be overcome or compromised to effectively use the glue. For example, high pH treatment will hydrolyze the protein and degrade the bonding properties of the glue. High pH producing reagents also tend to gel the protein to a semi-solid mass unsuitable as a glue. High pH producing reagents, particularly the alkali metal hydroxides and the alkaline earth metal hydroxides also interfere with the wetting properties of the protein, causing formation of lumps and an incomplete dispersion of protein when the glue is prepared. Gelling and hydrolysis of the protein limit the useful life of a glue prepared from protein. The useful life of the glue, known as the "pot life," depends on an additional factor, spoilage. A typical protein base glue has a moisture content of from 84 to 90 percent by weight and at that moisture the protein provides a superb medium for microbial growth. Spoilage occurs to the point that the adhesive properties are destroyed and the color and odor of the glue are unsatisfactory if the glue is not used within a short time. A typical protein glue will spoil within 4 and 24 hours.

SUMMARY OF THE INVENTION

I have discovered a new dispersing compound for "cold cutting" protein adhesives which produces a superior protein glue. The protein is dispersed in an aqueous slurry at a pH sufficiently high to develop the desired adhesive properties. The protein is dispersed without "balling" or "lumping" to form a smooth glue of the desired viscosity and flow characteristics. Gelling of the glue due to severe basic treatment is avoided.

The glue formed with the new dispersing compound is preserved against microbial spoilage by the dispersing compound. A glue having a long, stable "pot life" can be formed by mixing from about 2 to 5 percent by weight of my new dispersing compound with a slurry of protein adhesive material and water containing water and from about 12 to 15 percent by weight of a protein adhesive material. The glue doesn't gel or hydrolyze and is stable against microbial spoilage. By using the dispersing compound of the invention, it is possible to prepare protein glues having a useful "pot life" of up to 48 hours or more. Applicant has succeeded in preparing glues having a "pot life" of 25 days using the new dispersing compound.

Protein adhesives formed using dispersing compound have proven to be quite useful in laminating paperstock, particularly in tube winding and cone winding applications. The glues prepared as described herein perform very well on high speed automatic glueing machines and produce laminated articles, i.e., tubes and cones having good bond, high crush strength and good water resistance.

My new dispersing compound contains from about 45 to 75 percent by weight of a silicate alkalizing agent having a base to $SiO_2$ ratio of at least 1:1 or greater. Typical alkalizing agents are the sodium and potassium ortho, sesqui, and meta silicates. The dispersing compound contains from about 10 to 20 percent of a barium metaborate preservative to impart microbial stability to the glue. A glue plasticizing additive such as talc may be added in proportions of from about 0 to 30 percent by weight. From about 0 to 10 percent of wetting agents, defoamers, and dust control agents may be added to improve the handling properties of the dispersing compound.

DESCRIPTION OF THE PREFERRED EMBODIMENTS

A preferred dispersing compound of my invention was prepared by blending
 100 pounds prilled Sodium Orthosilicate
 40 pounds barium metaborate
 25 pounds talc
 10 pounds silicone defoamer (Nopco N X Z)
 5 pounds ethoxylated alkyl phenol wetting agent (Triton X-100)
 20 pounds ethylene glycol dust control agent in a ribbon blender until a uniform mix was obtained.

The ethylene glycol dust control agent prevents dusting of the compound when used and suppresses the irritating effect of dust when the dispersing compound is used. The wetting agent and defoamer assist in dispersing the formed protein glue by wetting the protein. The specific proportions of the ingredients can, of course, be varied within the limits disclosed above.

The dispersing compound may be blended with an aqueous slurry of an isolated protein glue base. The dispersing compound may be added to the slurry in dry form or dispersed in water. The glue formed using an aqueous slurry of dispersing compound may have slightly improved appearance. The preferred ratio of dispersing compound to protein is approximately 1:3, a typical range of addition being from about 10 percent to 25 percent by weight of dispersing compound in the total glue solids. Typically, from 12.5 to 16 percent by weight of glue solids and 84 to 87.5 percent water would be used to form an aqueous glue.

More specifically, the dispersing compound and protein base are added to water separately to form a glue. This would be accomplished by adding 50 pounds of unhydrolyzed soy protein (e.g., Ralston Purina Check-R-Lamn) containing one-half pound of isooctyl alcohol wetting agent (Southern Sizing RG–3) to 300 pounds of water and stirring until mixed. Ten pounds of the dispersing compound described above are then added and mixed. The pH of the mix rises to between about 12.0 to 13.0 in about five to ten minutes of mixing. Twenty pounds of a 37.5 percent solution of boric acid is then added to the glue dispersion and enough additional water to dilute the glue to about 9 percent protein and about 14 percent total solids. The pH of the mixture is buffered back to about 9 by the boric acid. (pH of 9 – 11.5 is satisfactory) A glue prepared as described above was stored to test microbial spoilage and was found to be stable after 25 days. The glue was not gelled or hydrolyzed. The glue was of about 200 cps. viscosity (about 20 seconds Marsh funnel) and performed well on a SKW Majer automatic cone winding machine to form laminated paper cones having good ply bond, water resistance and crush strength. The specific proportions of protein, water, and dispersing compound may, of course, be varied within the limits disclosed above.

The surprisingly long "pot life" and resistance of the glue to microbial spoilage is due to the combined effect of the alkalizing agent and barium metaborate preservative. The alkalizing agent raises the pH sufficiently high to disperse the protein and develop the glue properties. The high pH also provides an initial microbial kill to reduce the number of organisms present in the glue. The pH is then reduced to a level at which the glue is not gelled or hydrolyzed by the buffering agent. At this pH, the glue would support microbial growth. However, the barium metaborate preserves the glue and prevents spoilage. The combination of preservative and alkalizing agent cooperate to greatly extend the useful life of the glue.

I claim:

1. A dispersing and preservative compound for "cold cutting" unhydrolyzed soy protein glues consisting essentially of from about 45 to 75 percent by weight of a silicate alkalizing agent selected from the group consisting of sodium and potassium silicate alkalizing agents having a base to $SiO_2$ ratio of 1:1 or greater, from about 10 to 20 percent by weight of a barium metaborate preservative, from about 0 to 30 percent by weight of a glue plasticizer, and from about 0 to 10 percent by weight of defoamers, wetting agents and dust control agents.

2. The product of claim 1 containing talc as glue plasticizer.

3. The product of claim 1 wherein the dispersing compound contains about 5 percent by weight of silicone defoamer, about 2.5 percent by weight of ethoxylated alkyl phenol wetting agent, and about 10 percent by weight of ethylene glycol.

4. A method of preparing a "cold cutting" unhydrolyzed soy protein glue having a long shelf life and stable adhesive and flow properties comprising mixing from about 12.5 to 16 percent by weight of glue solids based on the total weight of the glue with from 84 to 87.5 percent by weight water based on the total weight of the glue; said glue solids comprising unhydrolyzed soy protein and from about 10 percent to 25 percent by weight, based on the total weight of the glue solids, of a dispersing compound; said dispersing compound comprising from about 45 to 75 percent by weight, based on the total weight of dispersing compound, of a silicate alkalizing agent selected from the group consisting of sodium and potassium silicate alkalizing agents having a base to $SiO_2$ ratio of 1:1 or greater and from 10 percent to 20 percent by weight, based on total amount of the dispersing compound, of a barium metaborate preservative; from about 0 to 30 percent by weight of a glue plasticizer, and from about 0 to 10 percent by weight of defoamers, wetting agents and dust control agents; said protein and said dispersing compound being mixed with said water separately; said mixing being effective to raise the pH of the mixture to between about 12.0 and 13.0; subsequently, buffering the pH back to between about 9 and 11.5 to impart stable adhesive and flow properties to the glue and to preserve it from spoilage.

5. The method of claim 4 wherein the dispersing compound contains about 5 percent by weight of silicone defoamer, about 2.5 percent by weight of ethoxylated alkyl phenol wetting agent, and about 10 percent by weight of ethylene glycol.

* * * * *

UNITED STATES PATENT AND TRADEMARK OFFICE
CERTIFICATE OF CORRECTION

PATENT NO. : 3,844,805
DATED : October 29, 1974
INVENTOR(S) : Ronald W. Long et al It is certified that error appears in the above-identified patent and that said Letters Patent are hereby corrected as shown below:

Column 1, line 39, the word "and" should be replaced with the word "to"

Column 1, line 65, the word "my" should be inserted after the word "using".

Signed and Sealed this second Day of December 1975

[SEAL]

Attest:

RUTH C. MASON
Attesting Officer

C. MARSHALL DANN
Commissioner of Patents and Trademarks